United States Patent
Kramer

(10) Patent No.: US 9,149,875 B2
(45) Date of Patent: Oct. 6, 2015

(54) DEVICE FOR CLAMPING A WORKPIECE HOLDER TO A COLLET CHUCK THAT CAN BE FIXED TO A MACHINE TOOL

(76) Inventor: Dieter W. Kramer, Auslikon (CH)

( * ) Notice: Subject to any disclaimer, the term of this patent is extended or adjusted under 35 U.S.C. 154(b) by 834 days.

(21) Appl. No.: 13/319,355

(22) PCT Filed: May 11, 2010

(86) PCT No.: PCT/EP2010/002885
§ 371 (c)(1),
(2), (4) Date: Nov. 17, 2011

(87) PCT Pub. No.: WO2010/130408
PCT Pub. Date: Nov. 18, 2010

(65) Prior Publication Data
US 2012/0056387 A1    Mar. 8, 2012

(30) Foreign Application Priority Data
May 12, 2009  (CH) ........................... 741/09

(51) Int. Cl.
| | | |
|---|---|---|
| B23B 31/107 | (2006.01) | |
| B23B 31/40 | (2006.01) | |
| B23B 31/173 | (2006.01) | |
| B23B 31/22 | (2006.01) | |
| B23Q 1/00 | (2006.01) | |

(52) U.S. Cl.
CPC ......... *B23B 31/4046* (2013.01); *B23B 31/1072* (2013.01); *B23B 31/16166* (2013.01); *B23B 31/223* (2013.01); *B23Q 1/0081* (2013.01); *Y10T 279/1004* (2015.01); *Y10T 279/1033* (2015.01); *Y10T 279/17752* (2015.01)

(58) Field of Classification Search
CPC ........................ B23B 31/1071; B23B 31/1072
USPC .......... 279/209, 2.1, 2.11, 2.12, 22, 30, 4.12, 279/4.04, 75, 82; 269/309, 310
See application file for complete search history.

(56) References Cited

U.S. PATENT DOCUMENTS

| | | | | |
|---|---|---|---|---|
| 1,056,076 A | * | 3/1913 | Wiard | 279/75 |
| 5,870,935 A | * | 2/1999 | Erickson et al. | 82/160 |
| 5,909,882 A | * | 6/1999 | Schill | 279/4.04 |
| 5,918,870 A | * | 7/1999 | Stark | 269/309 |
| 5,997,011 A | * | 12/1999 | Nordquist | 279/2.09 |

(Continued)

FOREIGN PATENT DOCUMENTS

| | | |
|---|---|---|
| DE | 3744092 A1 | 7/1989 |
| EP | 1068918 A1 | 1/2001 |
| GB | 593864 A1 | 10/1947 |

*Primary Examiner* — Eric A Gates
*Assistant Examiner* — Paul M Janeski
(74) *Attorney, Agent, or Firm* — Brian Roffe

(57) ABSTRACT

Device for clamping a workpiece holder on a collect chuck that can be fixed to a machine tool, having clamping elements distributed around the circumference of the collet chuck. The clamping elements can be adjusted radially to the axis of the collet chuck from a release to a clamping position and can be pressed against a circumferential surface of the workpiece holder positioned relative to the collet chuck in the clamping position. The clamping elements are designed as rollers having axes aligned nearly tangentially to the collet chuck circumference. A determinable surface pressure thus results in the clamping position as the rollers mutually contact the workpiece holder, a clamping mandrel of the collet chuck, and the collet chuck part. The surface pressure is thereby reduced and the collet chuck can also be used in the range of greater tensile forces.

20 Claims, 4 Drawing Sheets

(56) References Cited

U.S. PATENT DOCUMENTS

| | | | |
|---|---|---|---|
| 6,160,236 A * | 12/2000 | Nordquist | 219/69.15 |
| 6,161,826 A * | 12/2000 | Forrer | 269/309 |
| 6,367,814 B1 | 4/2002 | Luescher et al. | |
| 6,378,877 B1 | 4/2002 | Luescher et al. | |
| 6,485,214 B2 * | 11/2002 | Schill | 403/13 |
| 6,527,266 B1 * | 3/2003 | Yonezawa et al. | 269/309 |
| 6,532,861 B2 * | 3/2003 | Etter | 92/86 |
| 6,641,127 B2 * | 11/2003 | Haruna | 269/309 |
| 6,641,128 B2 * | 11/2003 | Fries | 269/309 |
| 6,905,117 B2 * | 6/2005 | Bernhard et al. | 269/309 |
| 7,232,121 B2 * | 6/2007 | Haruna | 269/309 |
| 7,520,495 B2 * | 4/2009 | Stark | 269/309 |
| 8,152,151 B2 * | 4/2012 | Sandmeier | 269/309 |
| 8,590,878 B2 * | 11/2013 | Haruna | 269/309 |
| 2004/0113346 A1 * | 6/2004 | Kawakami et al. | 269/309 |

* cited by examiner

DEVICE FOR CLAMPING A WORKPIECE HOLDER TO A COLLET CHUCK THAT CAN BE FIXED TO A MACHINE TOOL

FIELD OF THE INVENTION

The invention relates to a device for clamping a workpiece holder to a collet chuck that can be fixed to a machine tool.

BACKGROUND OF THE INVENTION

A device of this type is known from EP-A-1 068 918 wherein a hollow cylindrically designed workpiece holder is placed on the likewise hollow cylindrically designed collet chuck and is clamped to the collet chuck by means of a clamping device. The clamping device comprises a plurality of clamping elements distributed around the circumference of the collet chuck in the form of clamping balls which are functionally connected to a spring-loaded annular piston disposed in an annular space of the collet chuck. When the annular piston is acted upon hydraulically or pneumatically against the spring force the clamping balls are held in corresponding grooves of the collet chuck so that they do not project over its surface. If the pressure on the annular piston is reduced, the clamping balls are pressed by the annular piston due to the effect of the spring force into a circumferential annular groove of the workpiece holder, and in this way the workpiece holder is clamped to the collet chuck. The clamping forces are transferred over the puncitformly positioned clamping balls and are thus limited in size. If greater tensile forces occur, such devices fail due to exceedance of the Hertzian stress.

OBJECTS AND SUMMARY OF THE INVENTION

The object forming the basis of the present invention is to provide a device of the type specified at the start which also better withstands greater tensile forces.

This object is achieved according to the invention by a device having a plurality of clamping elements distributed around a circumference of the collet chuck that can be adjusted radially to an axis of the collet chuck from a release to a clamping position, and can be pressed against a circumferential surface of the workpiece holder positioned relative to the collet chuck in the clamping position in order to generate the clamping force securing the workpiece holder to the collet chuck. The clamping elements include rollers having axes aligned substantially tangentially to the collet chuck circumference such that in the clamping position, a determinable surface pressure is produced by mutual contact of these rollers with the workpiece holder, a clamping mandrel or an annular piston of the collet chuck and the collet chuck part.

Further preferred embodiments of the device according to the invention form the subject matter of the dependent claims.

With the device according to the invention wherein the clamping elements are designed as rollers having axes aligned tangentially to the collet chuck circumference which have a curved outer form at least over part of their length, the radius of the curve corresponding to the radius of the workpiece holder circumferential surface such that in the clamping position the rollers are advantageously in line contact with the workpiece holder circumferential surface, the surface pressure when the clamping forces securing the workpiece holder are generated can be considerably reduced, and the collet chuck can also be used in the range of greater tensile forces.

BRIEF DESCRIPTION OF THE DRAWINGS

In the following the invention will be described in more detail using the drawings. These show as follows.

DETAILED DESCRIPTION OF THE INVENTION

Figure 1:
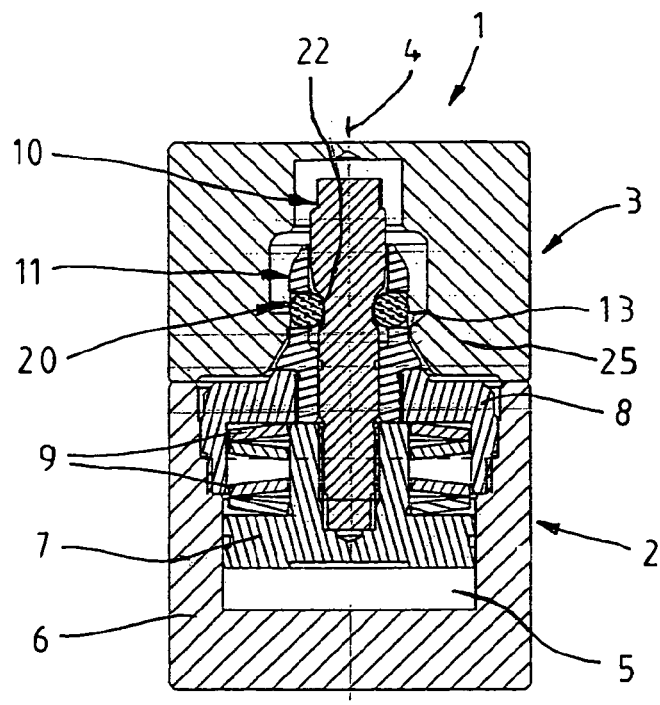
FIG. 1 is a longitudinal section of a first exemplary embodiment of a device according to the invention for clamping a workpiece holder to a collet chuck that can be fixed to a machine tool, with clamping elements in a release position.
Figure 2:
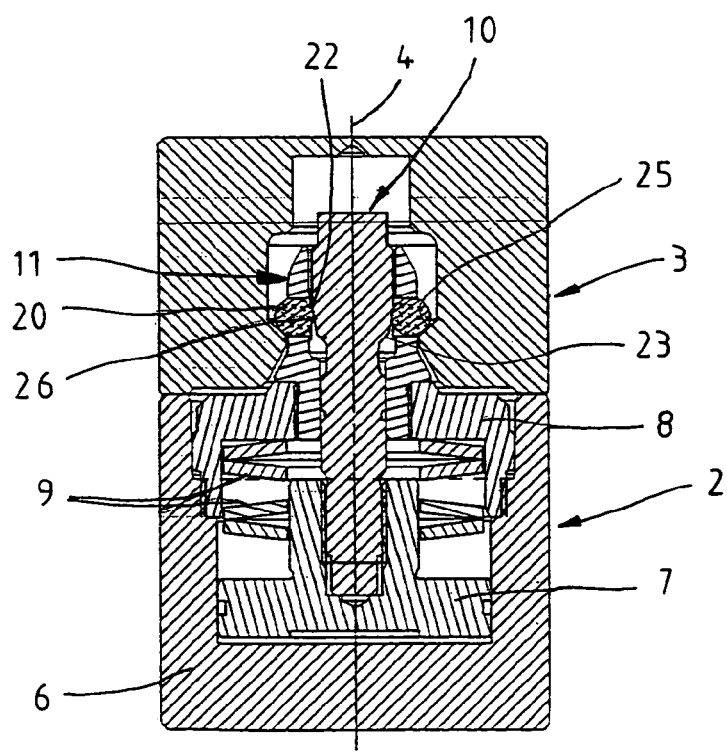
FIG. 2 is a longitudinal section of the device according to FIG. 1, with clamping elements in a clamping position.

In FIG. 1 and FIG. 2 a device 1 for clamping a workpiece holder 3 to a collet chuck 2 that can be fixed to a machine tool is shown. The workpiece holder 3 serves to hold a workpiece to be worked on the machine tool.

The collet chuck 2 comprises a piston/cylinder unit coaxial to the collet chuck axis 4 and which consists of a cylinder part 6 and a piston 7 disposed within the latter. A disc-shaped collet chuck part 8 is inserted into the cylinder part 6 from above. There is disposed between the disc-shaped collet chuck part 8 and the piston 7 a spring or a compound spring 9 optionally comprising two disc springs which strive to push the piston 7 downwards. The piston 7 can be acted upon pneumatically or hydraulically against the spring force, and so is held in its upper position according to FIG. 1 for as long as a chamber 5 enclosed by the cylinder part 6 beneath the piston 7 is pressurised.

The piston 7 is connected, for example screwed, to a central clamping mandrel 10 which upon the axial piston adjustment is guided within a further, fixed collet chuck part 11. The collet chuck part 11 guiding the clamping mandrel 10 is securely connected to the aforementioned disc-shaped collet chuck part 8.

There are made in the fixed collet chuck part 11 a number of radial grooves 13 which are distributed over the circumference of the collet chuck 2 or the collet chuck part 11. It is advantageous, as regards production, if two grooves 13 respectively are arranged radially opposite one another. The grooves 13 are provided to each hold a further roller 20, described in more detail below, and are designed such that in a release position shown in FIG. 1 the rollers 20 are held within the grooves 13, and the workpiece holder 3 placed, unobstructed, on the collet chuck 2. In the release position the rollers 20 are supported in a circumferential groove 22 of the clamping mandrel 10, the clamping mandrel 10 connected to the piston 7 being held in its uppermost position by the pressure prevailing in the chamber 5.

In order to clamp the workpiece holder 3 to the collet chuck 2 the pressure in the chamber 5 is reduced, and the piston 7 with the clamping mandrel 10 is pressed downwards by the compound spring 9. The rollers 20 are thereby pressed radially apart from one another over a conical outer surface 23 of the clamping mandrel 10 and pressed with their part projecting out of the respective groove 13 against a conical, downwardly tapering inner circumferential surface 25 of the workpiece holder 3.

In the clamping position shown in FIG. 2 the rollers 20 guided in grooves 13 lie on the one hand against the aforementioned inner circumferential surface 25 of the workpiece holder 3, and on the other hand against an outer clamping cone surface 26 of the clamping mandrel 10. The geometry of the conical workpiece holder circumferential surface 25 on the one hand and the clamping cone surface 24 on the other hand is optimised to the highest possible clamping forces. The clamping cone angle is preferably 6° to 15°, the conical workpiece holder circumferential surface 25 preferably encloses an angle of 45° to 75° with the workpiece holder or collet chuck axis 4.

Figure 3:
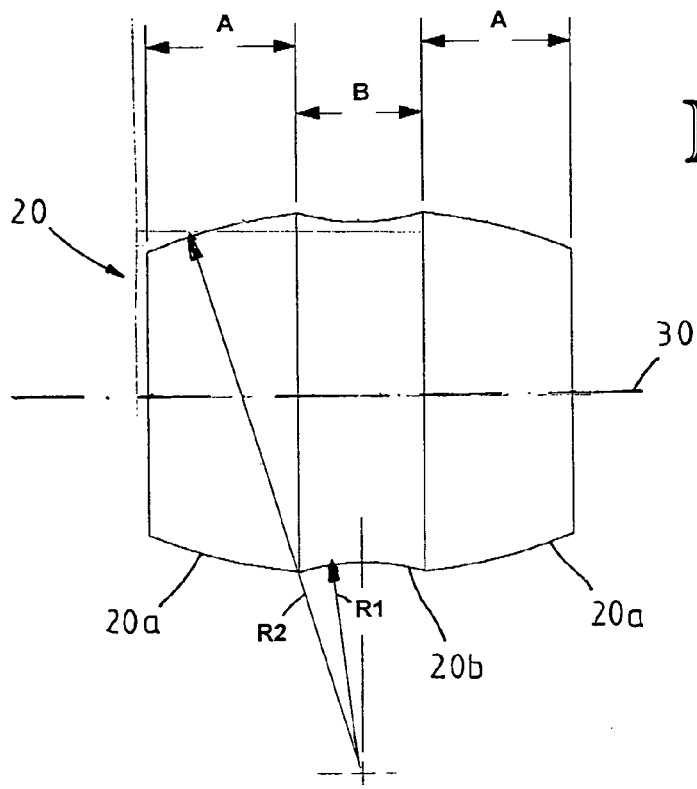
FIG. 3 is a side view of an exemplary embodiment of a clamping element according to the invention for the device according to FIGS. 1 and 2.
Figure 4:
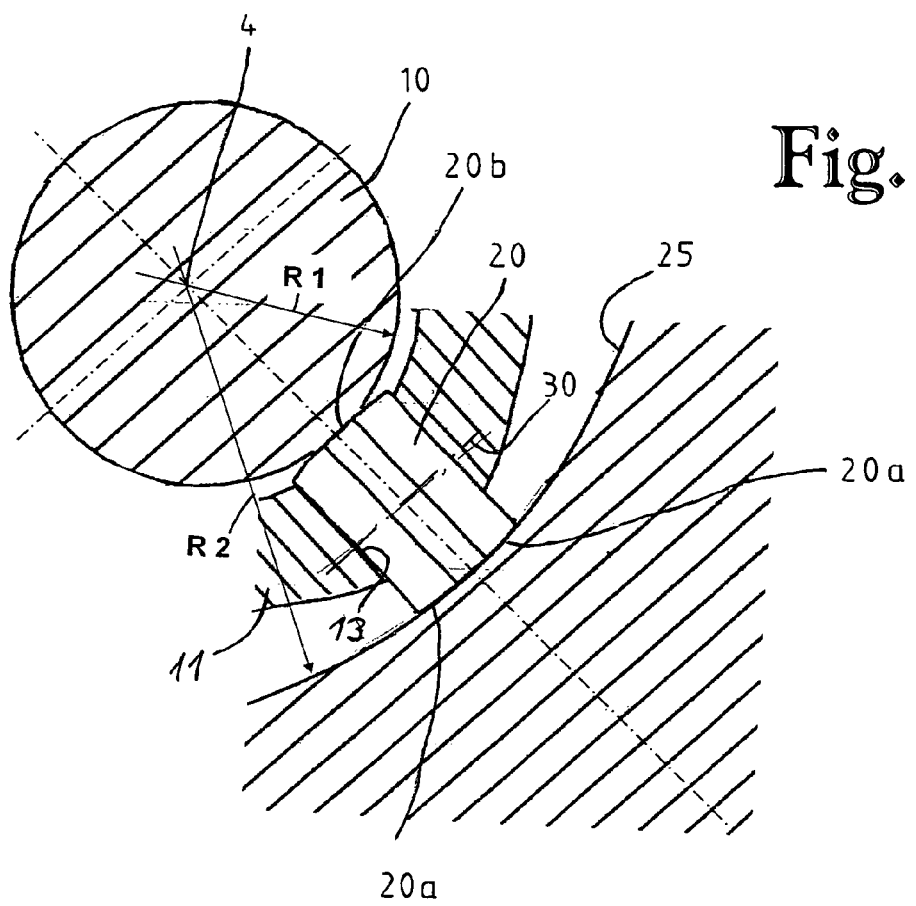
FIG. 4 is diagrammatically, a clamping element in the clamping position between a clamping mandrel and an inner circumferential surface of the workpiece holder.

The rollers 20 according to the invention, which can be adjusted radially from the release position into the clamping position and vice versa, are aligned with their axes 30 tangential to the collet chuck circumference, and according to FIG. 3 and FIG. 4 have at least over part of their length an outwardly curved outer form, the radius R2 corresponding to the curve of the radius of the workpiece holder circumferential surface 25 such that in the clamping position the rollers 20 are in line contact with the workpiece holder circumferential surface 25.

A particularly advantageous embodiment of a roller 20 is shown in FIG. 3. The roller 20 has two outwardly curved (convex) parts 20a with a radius R2 between which there is an inwardly curved (concave) part 20b with a radius R1. The convex parts 20a each extend over a length A of the roller 20, the concave part 20b over a length B. In the clamping position the rollers 20 are in line contact with the inner circumferential surface 25 of the workpiece holder over the convex parts 20a, and with the outer clamping cone surface 24 of the clamping mandrel 10 over the concave part 20b. Lengths A and B are not equal. Line length 2A and line length B are advantageously chosen such that in the clamping position more or less the same pressure is produced on the workpiece holder 3 and on the clamping mandrel 10, and this in turn is associated with the aforementioned geometry of the conical workpiece holder circumferential surface 25 on the one hand and the clamping cone surface 24 of the clamping mandrel 10 on the other hand.

Figure 5:
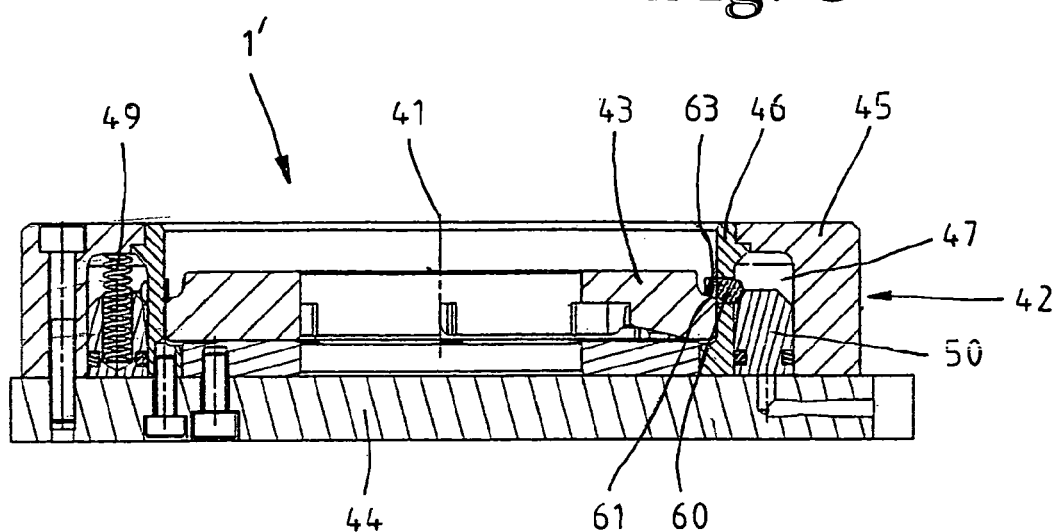
FIG. 5 is a longitudinal section of a second exemplary embodiment of a device according to the invention for clamping a workpiece holder to a collet chuck that can be fixed to a machine tool, with clamping elements in a release position.
Figure 6:
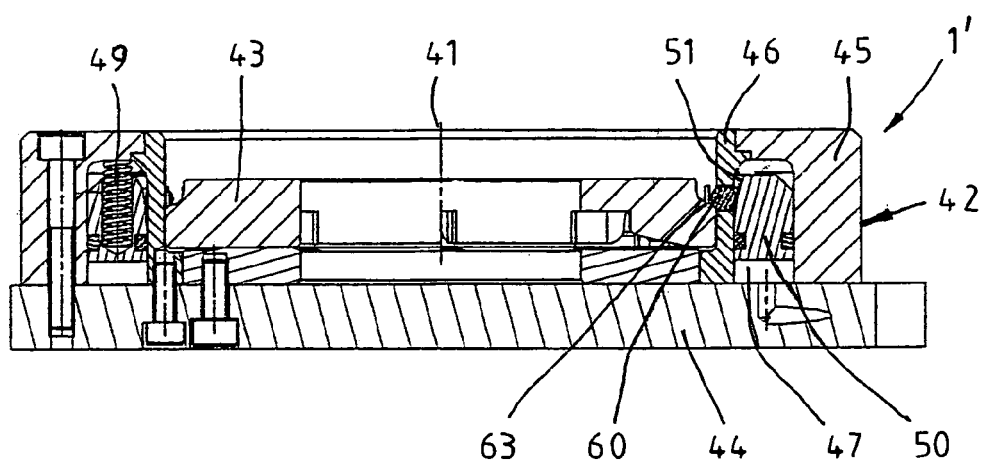
FIG. 6 is a longitudinal section of the device according to FIG. 5, with clamping elements in a clamping position.

Another embodiment of a device 1' for clamping a workpiece holder 43 to a collet chuck 42 is shown in FIGS. 5 and 6. The collet chuck 42 comprises a base part 44, an annular outer part 45 and an annular inner part 46 which together enclose an annular chamber 47 coaxial to the collet chuck axis 41 in which an annular piston 50 is arranged with axial adjustment. The pneumatically or hydraulically operable annular piston 50 is loaded in the axial direction by a number of springs 49 distributed over its circumference and which strive to press it downwards. The annular piston 50 has a conical inner surface 51 over which radial adjustment of the rollers 50 is brought about by the axial piston adjustment.

In turn, a number of rollers 60 are provided distributed over the circumference of the collet chuck 42 which are arranged in radial grooves 61 of the annular inner part 46. It is also an advantage with this embodiment, as regards production, if two grooves 61 are respectively arranged radially opposite one another although this does correspond to the illustration of FIGS. 5 and 6 because one wished to show the springs 49 in the left half of both figures.

FIG. 5 shows a release position in which the rollers 60 are located in the grooves 61 and the workpiece holder 43 is inserted, unobstructed, into the collet chuck 42 and can be positioned opposite the latter. In contrast to the embodiment of FIG. 1, in the release position the annular piston 50 is held by the springs 49 in its lowermost position, and no pressure prevails in the annular chamber 47. When the piston is acted upon, the annular piston 50 is moved upwards and the rollers 50 are pressed radially inwards over the conical inner surface 51, and with their part projecting out of the respective groove 61 pressed against a conical, downwardly widening outer circumferential surface 63 of the workpiece holder 43 inserted into the collet chuck 42.

The clamping position is shown in FIG. 6. Here, according to the invention, the respective roller 60 has an inwardly curved (concave) part 60b (FIG. 7) over which it is in line contact with the outer workpiece holder circumferential surface 63.

Figure 7:
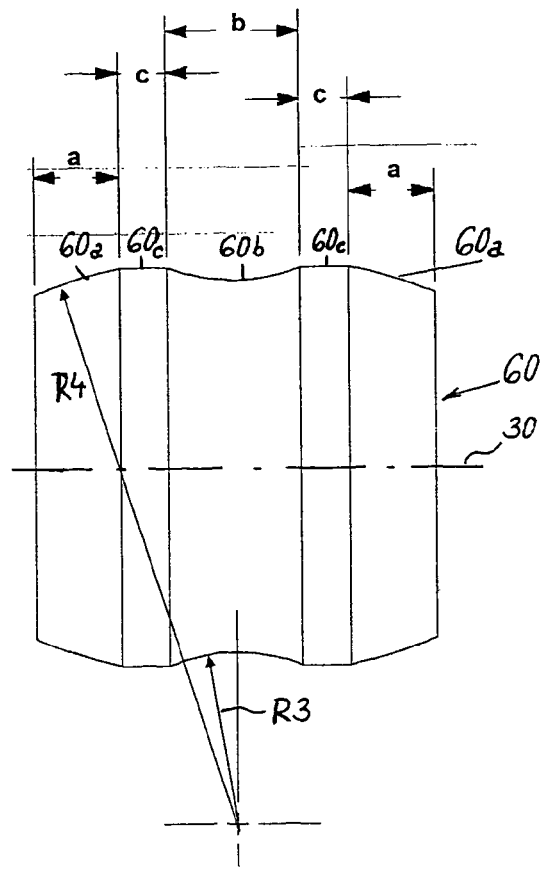
FIG. 7 is a side view of a further exemplary embodiment of a clamping element according to the invention for the device according to FIGS. 5 and 6.

A particularly advantageous embodiment of a roller 60 is shown in FIG. 7. The roller 60 is respectively provided with a circular cylindrical part 60c adjoining the concave part 60b (with a radius R3) on both sides and guided within the respective radial groove 61. There is adjoining each circular cylindrical part 60c an outwardly curved (convex) part 60a, the rollers 60 respectively being in line contact with the circumferential surface 63 over the two convex parts 60a. The central concave part 60b extends over a length b of the roller 60, and the convex parts 60a respectively over a length a, and the circular cylindrical parts 60c respectively over a length c.

Figure 8:
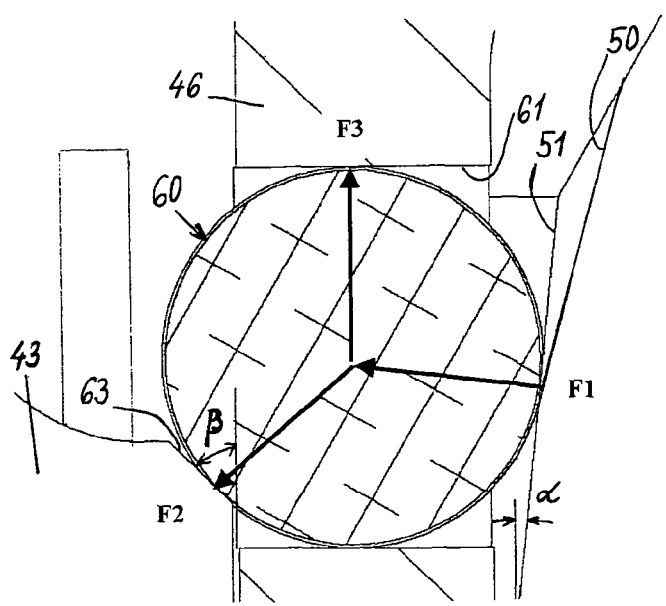
FIG. 8 is diagrammatically, the distribution of forces acting on the clamping element according to FIG. 7.

In FIG. 8 the allocation of the forces F1, F2 and F3, as transferred via the individual roller parts 60a, 60b, 60c, is indicated. Here force F1 is produced between the concave parts 60b of the roller 60 and the conical inner surface 51 of the annular piston 50, force F2 between the concave part 60a and the outer circumferential surface 63 of the workpiece holder 43, and force F3 between the circular cylindrical parts 60c and the groove 61 of the annular inner part 46 of the collet chuck. The size of the force components is associated with the geometry of the conical workpiece holder circumferential surface 63 on the one hand and the clamping cone surface (conical inner surface 51) of the annular piston 50 on the other hand which is optimised to the greatest possible clamping forces. Here the clamping cone angle α is preferably 6° to 15°, the conical workpiece holder circumferential surface 63 is preferably at an angle β of 45° to 75° to the vertical or to the workpiece holder axis.

The size of the line lengths a, b, c (FIG. 7) is in turn advantageously chosen such that more or less equal surface pressure is produced at the individual contact points.

With the device according to the invention in which the clamping elements are designed as rollers with axes aligned tangentially to the collet chuck circumference and which have a curved outer form, at least over part of their length, the radius of the curve corresponding to the radius of the workpiece holder circumferential surface such that in the clamping position the rollers are in line contact with the workpiece holder circumferential surface, the surface pressure can be considerably reduced by generating the clamping forces securing the workpiece holder, and the collet chuck can also be used in the range of greater tensile forces.

Within the framework of the invention this device can also be used when pressing, for example for pressing plastic or sintered metal parts with which a workpiece holder can also be understood to be a type of tool holder for dies or the like.

The rollers can also be cylindrical rollers or those with which, for example according to FIG. 3, the radius R1 in the part 20b of the roller 20 is omitted, and so the roller is partially cylindrical and partially curved in design.

The invention claimed is:

1. A device for clamping a workpiece holder to a collet chuck that can be fixed to a machine tool, comprising: a first collet chuck part, a second collet chuck part that is movable relative to the first collet chuck part, and a plurality of clamping elements distributed around a circumference of the collet chuck that can be adjusted radially to an axis of the collet chuck between a release position and a clamping position, and can be pressed against a circumferential surface of the workpiece holder positioned relative to the collet chuck in the clamping position in order to generate clamping force securing the workpiece holder to the collet chuck, the clamping elements comprising rollers having only a single operational axis of rotation aligned substantially tangentially to the collet chuck circumference such that in the clamping position, surface pressure is produced by mutual contact of these rollers with the workpiece holder, the second collet chuck part, and the first collet chuck part, and wherein the rollers each include two convex parts and a concave part between the two convex parts.

2. The device according to claim 1, the rollers have a curved outer form at least over part of their length in a direction of their single operational axis of rotation, a radius of the curve corresponding to a radius of a workpiece holder circumferential surface such that in the clamping position, the rollers are in line contact with the workpiece holder circumferential surface.

3. The device according to claim 1, further comprising a spring-loaded and pneumatically or hydraulically operable piston arranged in the collet chuck for radial adjustment of the rollers.

4. The device according to claim 3, wherein the second collet chuck part comprises a central clamping mandrel, the piston being arranged coaxially to the collet chuck axis and connected to the clamping mandrel, the clamping mandrel having a conical outer surface for radially adjusting the rollers, in the clamping position, the rollers being in line contact with an inner circumferential surface of the workpiece holder over the convex parts.

5. The device according to claim 4, wherein the first collet chuck part includes radial grooves, the rollers being guided in the radial grooves of the first collet chuck part and in the clamping position, a part of the rollers projecting out of the grooves and being in line contact with the inner circumferential surface of the workpiece holder and with the conical outer surface of the clamping mandrel, a clamping cone angle being 6° to 15°, and the workpiece holder inner circumferential surface being conical and enclosing an angle of 45° to 75° with the workpiece holder or collet chuck axis.

6. The device according to claim 1, wherein the rollers are configured such that in the clamping position, the rollers are in line contact with the inner circumferential surface of the workpiece holder over the convex parts and with the second collet chuck part over the concave part.

7. The device according to claim 5, wherein a length of the concave part of the respective roller and a length of its two convex parts are such that in the clamping position, with the roller/workpiece holder and roller/clamping mandrel line contact there is substantially equal surface pressure.

8. The device according to claim 1, wherein the second collet chuck part comprises a spring-loaded and pneumatically or hydraulically operable annular piston arranged in the collet chuck for radial adjustment of the rollers, the piston being disposed in an annular chamber of the collet chuck, the rollers being radially adjustable over a conical inner surface of the annular piston and in the clamping position, are in line contact with an outer circumferential surface of the workpiece holder over the concave part.

9. The device according to claim 8, wherein the rollers are guided in radial grooves of the first collet chuck part and in the clamping position, a part of the rollers projecting out of the grooves and being in line contact with the outer circumferential surface of the workpiece holder inserted into the collet chuck, and with the conical inner surface of the annular piston, a clamping cone angle (a) of the annular piston being 6° to 15°, and the workpiece holder outer circumferential surface being conical and enclosing an angle (β) of 45° to 75° with the workpiece holder or collet chuck axis.

10. The device according to claim 9, wherein the rollers are guided in the respective radial groove, each roller further including a circular cylindrical part adjoining the concave part on both sides, a respective one of the convex parts adjoining each circular cylindrical part, the rollers being in line contact with the conical inner surface of the annular piston over the two convex parts.

11. The device according to claim 10, wherein a length of the concave part of the respective roller, a length of their two circular cylindrical parts and the length of their two convex parts are such that in the clamping position there is substantially equal pressure with the roller/workpiece holder, roller/groove and roller/annular piston line contact.

12. The device according to claim 2, further comprising a spring-loaded and pneumatically or hydraulically operable piston arranged in the collet chuck for radial adjustment of the rollers.

13. The device according to claim 12, wherein the second collet chuck part comprises a central clamping mandrel, the piston being arranged coaxially to the collet chuck axis and connected to the clamping mandrel, the clamping mandrel having a conical outer surface for radially adjusting the rollers, in the clamping position, the rollers being in line contact with an inner circumferential surface of the workpiece holder over the convex parts.

14. The device according to claim 13, wherein the first collet chuck part includes radial grooves, the rollers being guided in the radial grooves of the first collet chuck part and in the clamping position, a part of the rollers projecting out of the grooves and being in line contact with the inner circumferential surface of the workpiece holder, and with the conical outer surface of the clamping mandrel, a clamping cone angle being 6° to 15°, and the workpiece holder inner circumferential surface being conical and enclosing an angle of 45° to 75° with the workpiece holder or collet chuck axis.

15. The device according to claim 13, wherein in the clamping position, the rollers are in line contact with the conical outer surface of the clamping mandrel over the concave part.

16. The device according to claim 15, wherein a length of the concave part of the respective roller and a length of its two convex parts are such that in the clamping position, with the roller/workpiece holder and roller/clamping mandrel line contact there is substantially equal surface pressure.

17. The device according to claim 1, wherein the rollers are configured such that in the clamping position, the rollers are in line contact with an outer circumferential surface of the workpiece holder over the concave part and are in line contact with the second collet chuck part over the convex parts.

18. The device according to claim 1, wherein the first collet chuck part defines grooves in which the rollers are held in the release position not in contact with the circumferential surface of the workpiece holder, the rollers being configured to roll about their axis of rotation to project from the grooves in the clamping position into contact with the circumference surface of the workpiece holder.

19. The device according to claim 18, wherein the rollers are guided in the respective radial groove, each roller further including a circular cylindrical part adjoining the concave part on both sides, a respective one of the convex parts adjoining each circular cylindrical part, the rollers being in line contact with the conical inner surface of the annular piston over the two convex parts.

20. The device according to claim 19, wherein a length of the concave part of the respective roller, a length of their two circular cylindrical parts, and the length of their two convex parts are such that in the clamping position there is substantially equal pressure with the roller/workpiece holder, roller/groove and roller/annular piston line contact.

* * * * *